United States Patent [19]

Bi et al.

[11] Patent Number: 5,485,071
[45] Date of Patent: Jan. 16, 1996

[54] METHOD AND APPARATUS FOR ESTABLISHING A REFERENCE CURRENT FOR USE IN OPERATING A SYNCHRONOUS MOTOR

[76] Inventors: Chao Bi; Kuan-Teck Chang; Teck-Seng Low, all of Magnetics Technology Centre, National University of Singapore, 10 Kent Ridge Rd., Singapore 0511, Singapore

[21] Appl. No.: 393,028

[22] Filed: Feb. 23, 1995

Related U.S. Application Data

[63] Continuation of Ser. No. 103,517, Aug. 9, 1993, abandoned.

[51] Int. Cl.⁶ ........................................ H02P 6/02
[52] U.S. Cl. ........................ 318/700; 318/715; 318/721
[58] Field of Search ...................... 318/138, 139, 318/43–89, 700–799, 254, 807, 602, 615, 632, 629, 561, 611; 73/126, 146; 388/815, 902, 906; 364/827, 726

[56] References Cited

U.S. PATENT DOCUMENTS

| | | | |
|---|---|---|---|
| 3,979,651 | 9/1976 | Bringol | 318/138 |
| 4,047,083 | 9/1977 | Plunkett | 318/231 |
| 4,384,242 | 5/1983 | Ono | 318/721 |
| 4,484,129 | 11/1984 | Ono | 318/807 |
| 4,540,925 | 9/1985 | Jones | 318/602 |
| 4,577,497 | 3/1986 | Ray et al. | 73/126 |
| 5,113,125 | 5/1992 | Stacey | 318/721 |
| 5,167,002 | 11/1992 | Fridhandler | 388/815 |
| 5,274,313 | 12/1993 | Amrhein | 318/629 |
| 5,296,793 | 3/1994 | Lang | 318/715 |
| 5,296,794 | 3/1994 | Lang et al. | 318/715 |

*Primary Examiner*—Paul Ip
*Attorney, Agent, or Firm*—Laubscher & Laubscher

[57] ABSTRACT

A method of establishing a reference current for use in operating a synchronous motor. A torque-angle profile of the motor is obtained, an excitation component and a reluctance component of the torque-angle profile are obtained, and the reference current is obtained from the excitation component and the reluctance component of the torque-angle profile.

7 Claims, 5 Drawing Sheets

METHOD AND APPARATUS FOR ESTABLISHING A REFERENCE CURRENT FOR USE IN OPERATING A SYNCHRONOUS MOTOR

This application is a continuation of application Ser. No. 08/103,517 filed Aug. 9, 1993, now abandoned.

BACKGROUND OF THE INVENTION

1. Field of the Invention

The present invention relates to the operation of synchronous motors. More particularly, the present invention relates to a method and apparatus for establishing one or more reference currents for use in operating a synchronous motor.

2. Description of Related Art

The torque produced by a synchronous motor usually contains pulsations of rich harmonics. These harmonics are generally due to imperfect interactions between the magnetic flux of the rotor and stator currents. In many cases, the pulsating torque causes deterioration of machine performance and may produce noise and vibration that can be detrimental to the motor. Much effort has been expended in attempts to solve this torque pulsation problem.

In one approach, the problem is addressed with appropriate motor designs. In particular, the structure of the motor is optimized to reduce the sources of harmonics. For example, the reluctance torque is suppressed by surface mounting of the rotor magnets and skewing of the stator slots.

In another approach, the problem is addressed with innovative control strategies. For example, current inputs to the motor are controlled so that no harmonic torque is produced. This approach has more flexibility than the first approach because a general control methodology, once found, can be applied to motors with various designs. Recently, this second approach has become attractive due to the development and availability of fast power electronics and digital electronics with which more sophisticated control can be realized.

SUMMARY OF THE INVENTION

Features and advantages of the invention will be set forth in the description which follows, and in part will be apparent from the description or may be learned by practice of the invention. The objectives and other advantages of the invention will be realized and attained by the methods and apparatuses particularly pointed out in the written description and claims hereof as well as the appended drawings.

To achieve these and other advantages and in accordance with the purpose of the invention, as embodied and broadly described, the invention provides for a method of and apparatus for establishing a reference current for use in operating a synchronous motor, wherein the reference current is established from an excitation component and a reluctance component of a torque-angle profile of the motor.

In another aspect, the invention provides for a method of and apparatus for operating a synchronous motor in accordance with a torque command and an excitation component and reluctance component of a torque-angle profile of the motor. A reference current is established from the torque command and the excitation component and reluctance component of the torque-angle profile and the reference current is compared with a feedback current to generate a switching signal. A drive signal is generated in accordance with the switching signal and the drive signal is supplied to the motor.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate several embodiments of the invention and, together with the description, serve to explain the principles of the invention. In the drawings.

DETAILED DESCRIPTION OF THE INVENTION

Reference will now be made in detail to the present preferred embodiments of the invention, examples of which are illustrated in the accompanying drawings. Wherever possible, the same reference numbers will be used throughout the drawings to refer to the same or like parts. Although the present invention is applicable to synchronous motors having any number of phase windings, the invention will be described in connection with synchronous motors having three phase windings, i.e., an A-phase winding, a B-phase winding, and a C-phase winding.

As described above, the present invention provides for a method of and apparatus for establishing one or more reference currents for use in operating a synchronous motor, wherein the reference currents are established from an excitation component and reluctance component of a torque-angle profile of the motor. For the purposes of this invention, the torque-angle profile of a synchronous motor is a trace or profile of the torque produced by one or more of the phase windings of the motor, i.e., the per-phase torques, with respect to an angular position of the motor's rotor. As will be explained in more detail below, it is contemplated that for symmetrical synchronous motors, i.e., motors where the windings are identical and evenly spaced, the reference currents can be established merely by obtaining the excitation component and reluctance component of the torque-angle profile of one phase winding of the motor. As will be also explained in more detail below, the reference currents established in accordance with the teachings of the invention can be used to control the supply of one or more drive signals to the phase windings of the synchronous motor in such a manner that the motor produces a desired output torque.

Figure 1:
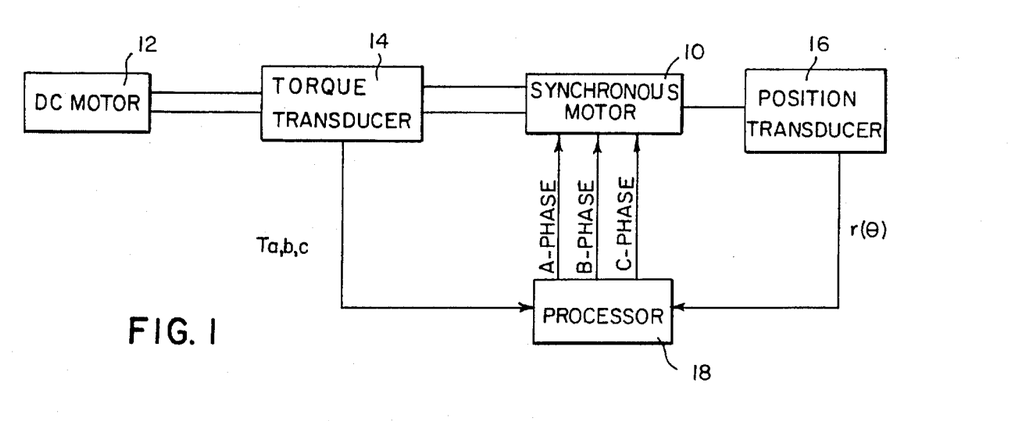
FIG. 1 is a block diagram of an arrangement for obtaining the torque-angle profile of a synchronous motor in accordance with the teachings of the present invention.

Generally, the total output or composite torque $T_s$ produced by a three-phase synchronous motor can be expressed as follows:

$$T_s = T_a(\theta, i_a) + T_b(\theta, i_b) + T_c(\theta, i_c) \qquad \text{Eqn. 1.0}$$

where $\theta$ is the angular position of the motor's rotor with respect to a reference position, $i_a$, $i_b$, and $i_c$ are the input phase currents for the motor's A-phase, B-phase, and C-phase windings, respectively, and $T_a$, $T_b$, and $T_c$ are the per-phase torques produced by the phase currents $i_a$, $i_b$, and $i_c$, respectively. To establish a reference current for use in operating a synchronous motor in accordance with the teachings of the present invention, the torque-angle profile for the synchronous motor must first be obtained, for example, by use of the arrangement shown in FIG. 1.

As shown in FIG. 1, a DC motor 12, a torque transducer 14, and a position transducer 16 are coupled to the rotor (not shown) of a synchronous motor 10 having an A-phase winding, a B-phase winding, and a C-phase winding. The outputs of the torque transducer 14 and the position transducer 16 are coupled to a processor 18.

To obtain, for example, the A-phase torque-angle profile of the synchronous motor 10, the synchronous motor 10 is mechanically driven by the DC motor 12 while the A-phase winding of the synchronous motor 10 is supplied with a current of one ampere and the B-phase and C-phase windings of the synchronous motor 10 are left open. As the synchronous motor 10 is mechanically driven, the angular position $r(\theta)$ of the rotor (not shown) of the synchronous motor 10 is detected with respect to a reference position by the position transducer 16 and provided to the processor 18. Concurrently, the A-phase torque $T_a$ of the synchronous motor 10 is measured by the torque transducer 14 and provided to the processor 18. Preferably, the synchronous motor 10 is driven by the DC motor 12 slowly enough such that the dynamics of the torque transducer 14 are negligible.

Figure 2:
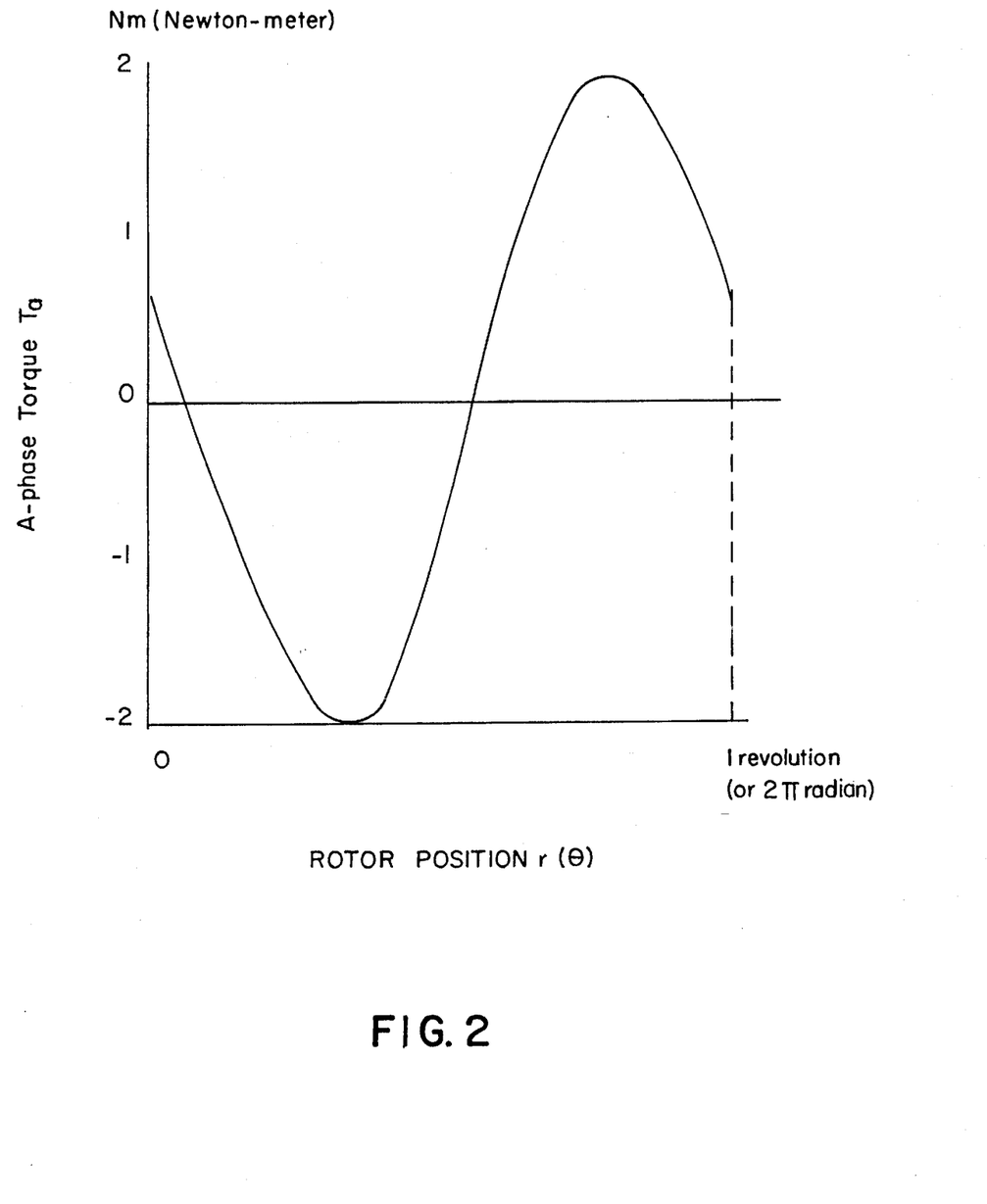
FIG. 2 is an A-phase torque-angle profile of a synchronous motor obtained from the arrangement of FIG. 1.

As the processor 18 receives the torque and position measurements from the torque transducer 14 and the position transducer 16, respectively, the processor 18 records and compiles the measurements to obtain the A-phase torque-angle profile of the synchronous motor 10. An example of such an A-phase torque-angle profile is illustrated in FIG. 2.

To obtain the B-phase torque-angle profile of the synchronous motor 10, the foregoing procedure is performed only the B-phase winding of the synchronous motor 10 is supplied with a current of one ampere and the A-phase and C-phase windings of the synchronous motor 10 are left open. Similarly, to obtain the C-phase torque-angle profile of the synchronous motor 10, the same procedure is performed, only the C-phase winding of the synchronous motor 10 is supplied with a current of one ampere and the A-phase and B-phase windings of the synchronous motor 10 are left open. It should be appreciated that if the synchronous motor 10 has a symmetrical structure, only the A-phase torque-angle profile need be obtained since the B-phase and C-phase torque-angle profiles can be deduced from the A-phase torque-angle profile by simply shifting the A-phase torque-angle profile by 120° and 240°, respectively. If the synchronous motor 10 is not symmetrical, however, all three torque-angle profiles should be obtained independently.

Once the torque-angle profile of the motor has been obtained, an excitation component and a reluctance component of the torque-angle profile are obtained. In particular, the torque-angle profile of the motor is broken down into an excitation component Te and a reluctance component Tr as follows:

$$T_{a,b,c} = Te + Tr \qquad \text{Eqn. 2.0}$$

where the excitation component Te and the reluctance component Tr can be expressed as the following Fourier series:

$$Te = \sum_{m=1}^{\infty} Te_m \sin[(2m-1)\theta + \phi_m] \qquad \text{Eqn. 3.0}$$
$$= Te_1 \sin(\theta) + Te_2 \sin(3\theta) + Te_3 \sin(5\theta) + \ldots$$

$$Tr = \sum_{m=1}^{\infty} Tr_m \sin[(2m\theta + \Psi_m)] \qquad \text{Eqn. 4.0}$$
$$= Tr_1 \sin(2\theta) + Tr_2 \sin(4\theta) + Tr_3 \sin(6\theta) + \ldots$$

Again, if the motor is symmetrical, only the excitation component and reluctance component of the torque-angle profile of one phase winding of the motor need be obtained. Further, it is contemplated that the excitation and reluctance components of the torque-angle profile can be obtained by any number of spectral analysis tools known to those skilled in the art such as, for example, Fourier Analysis.

It should be noted that the excitation component Te is generally produced as a result of the interaction of the stator currents with the air gap flux of the motor and contains only odd order harmonics of the per-phase torque. The reluctance component Tr, on the other hand, is produced as a result of reluctance variation due to the motor saliencies and contains only even order harmonics of the per-phase torque. Further, the reluctance component Tr can be further broken down into a cogging component and a ripple component. The cogging component is due to a mutual-reluctance effect and is that portion of the reluctance component Tr that depends on the rotor position. The cogging component exists in the absence of any armature current and is normally minimized in motor designs to be relatively negligible, e.g., about 1–2 percent of the total motor torque. The ripple component is due to a self-reluctance effect and is a consequence of armature current commutation and harmonics that do not produce constant and smooth torque.

Once the excitation and reluctance components of the torque-angle profile of the motor have been obtained, one or more reference currents for use in operating the motor can be established. For example, by taking into account the fact that if a motor is to produce a smooth and constant output torque the triplen, i.e., the third, sixth, ninth, etc., harmonics should not exist in the motor's per-phase torques, reference currents for use in operating the motor can be established such that the motor produces the desired smooth and constant output torque. Likewise, by further taking into account the power loss characteristics of the motor, reference currents can be established for use in operating the motor such that the motor produces not only a smooth and constant output torque but also a maximum output torque.

For example, to establish a reference current that will result in a smooth, constant, and maximum output torque, a phase current $Ia_1$ is first established from the excitation component Te and the reluctance component Tr of the A-phase torque $T_a$ of the motor. More specifically, the phase current $Ia_1$ is established in accordance with the following relationship:

$$T_s = \frac{3}{2} Ia_1 \left[ 1 - \frac{2Ia_1 Tr_1}{Te_1 + (Te_1^2 + 8Ia_1^2 Tr_1^2)^{1/2}} \right]^{1/2} * \qquad \text{Eqn. 5.0}$$
$$\left[ Te_1 + Ia_1 Tr_1 \frac{2Ia_1 Tr_1}{Te_1 + (Te_1^2 + 8Ia_1^2 Tr_1^2)^{1/2}} \right]$$

If the motor is not symmetrical, phase currents $Ib_1$ and $Ic_1$ for the B-phase and C-phase windings, respectively, should also be established in accordance with the following relationships:

Once the phase current $Ia_1$ has been established, a delay angle of the phase current $Ia_1$ is established. Using the minimum power loss theory, the phase current $Ia_1$ will result in minimal loss of power if it has a delay angle $\xi a_1$ as follows:

$$\xi a_1 = \sin^{-1}\left[\frac{-Te_1 + (Te_1^2 + 8Ia_1^2 Tr_1)^{1/2}}{4Ia_1 Tr_1}\right] \quad \text{Eqn. 6.0}$$

Having established the delay angle $\xi a_1$, a reference torque $T_{aREF}$ for the A-phase winding of the motor is established as follows:

$$T_{aREF} = [Ia_1 \sin(\theta + \xi a_1)]Te_1\sin(\theta) + \quad \text{Eqn. 7.0}$$
$$[Ia_1\sin(\theta + \xi a_1)]^2 Tr_1 \sin(2\theta)$$

It should be noted that the reference torques $T_{aREF}$, $T_{bREF}$, and $T_{cREF}$ are the desired per-phase torques that the motor should produce during operation. It should also be noted that these reference torques do not contain any triplen harmonics.

Finally, a reference current $i_{aREF}$ for the A-phase winding of the motor is established from the reference torque $T_{aREF}$ as follows:

$$i_{aREF} = \begin{bmatrix} \frac{-Te + (Te^2 + 4T_{aREF}Tr)^{1/2}}{2Tr} & \text{for } Te > 0 \\ \frac{-Te - (Te^2 + 4T_{aREF}Tr)^{1/2}}{2Tr} & \text{for } Te \leq 0 \end{bmatrix} \quad \text{Eqn. 8.0}$$

Assuming that the motor is symmetrical, reference currents $i_{bREF}$ and $i_{cREF}$ for the B-phase winding and C-phase winding of the motor, respectively, can be established as follows:

$$i_{bREF} = i_{aREF}(\theta - 120°) \quad \text{Eqn. 9.0}$$

$$i_{cREF} = i_{aREF}(\theta - 240°) \quad \text{Eqn. 10.0}$$

Although one technique for establishing one or more reference currents from the excitation component and reluctance component of a synchronous motor's torque-angle profile has been described thus far, it is contemplated that any number of techniques can be used, each technique being tailored for achieving a desired output torque. Thus, the foregoing technique for establishing the reference currents is not meant to be limiting and is shown only as an example.

Figure 3:
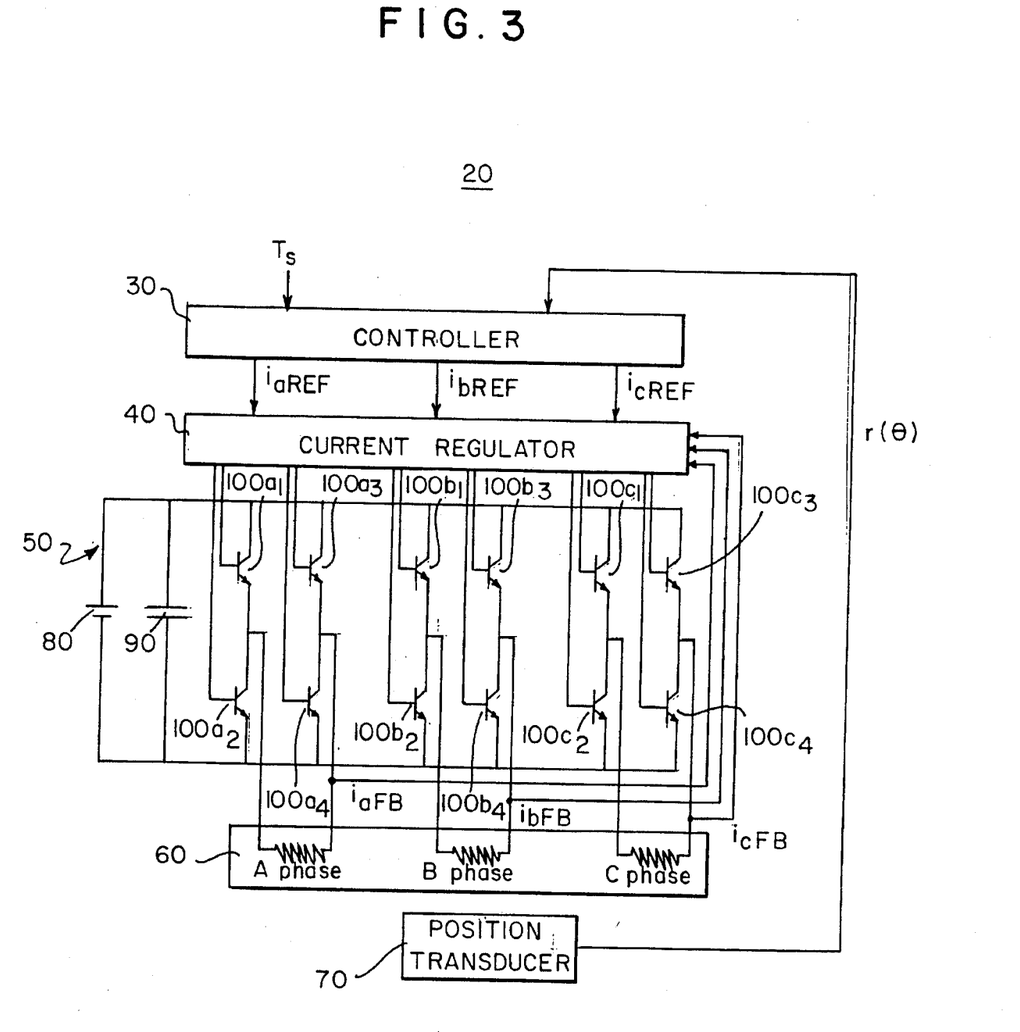
FIG. 3 is a circuit diagram of a first motor circuit in accordance with the teachings of the present invention.

As mentioned above, the reference currents established by the present invention can be used in operating a synchronous motor. In particular, it is contemplated that these reference currents are applicable to synchronous motor circuits such as the synchronous motor circuit 20 illustrated in FIG. 3. As shown in FIG. 3, the synchronous motor circuit 20 comprises a controller 30, a current regulator 40, an inverter 50, a synchronous motor 60, and a position transducer 70.

Preferably, the controller 30 includes a digital processor, such as a digital signal processor capable of performing high-speed computations. The controller 30 preferably also includes a memory for storing a model of the motor 60, whereby the motor 60 is characterized by the excitation component and reluctance component of the torque-angle profile of the motor 60.

Figure 4:
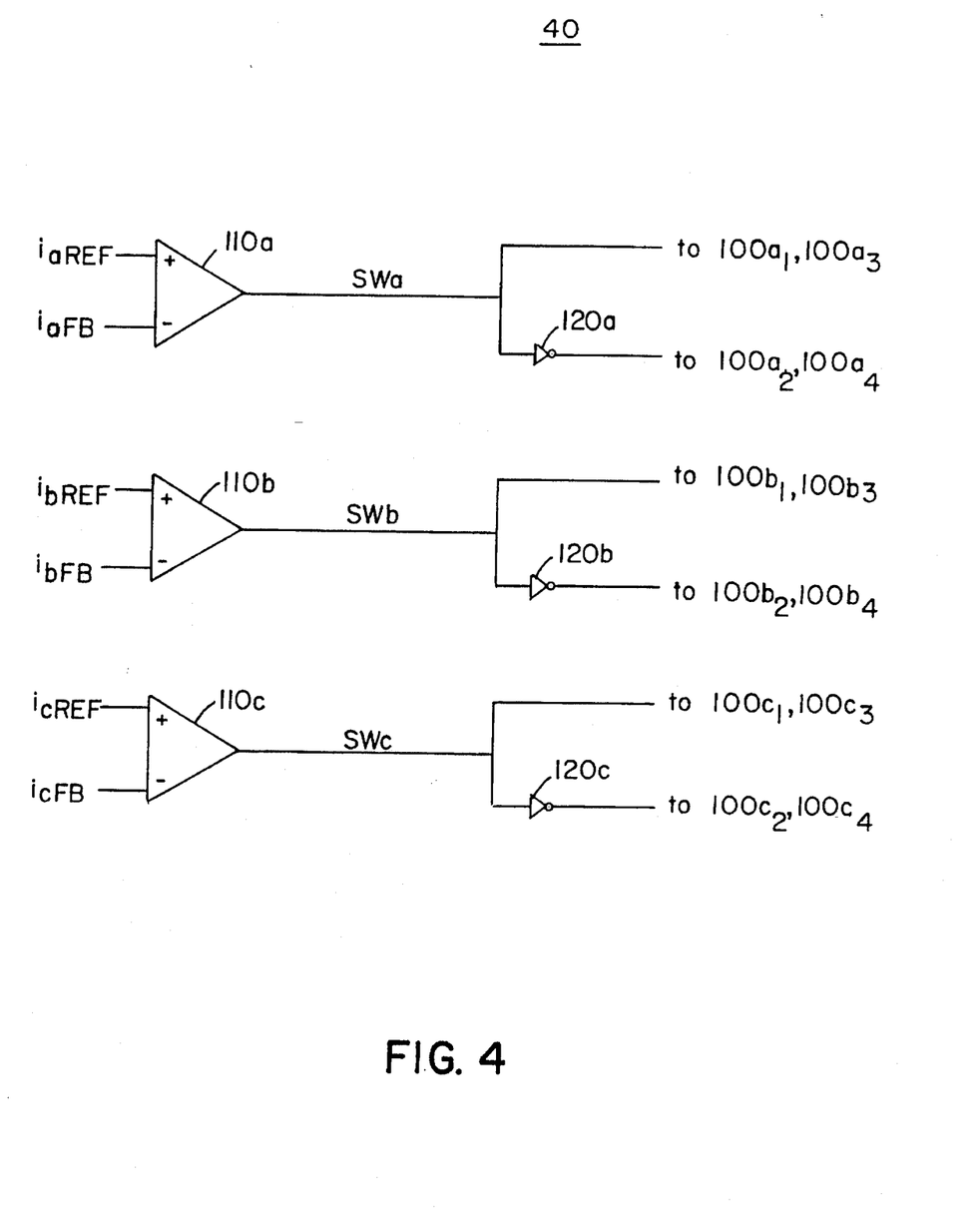
FIG. 4 is a circuit diagram of the current regulator of the motor circuit of FIG. 3.

The current regulator 40 preferably includes a comparator circuit such as that shown in FIG. 4. Alternatively, the current regulator 40 can be implemented in software stored in an executed by the controller 30 or other processor (not shown).

The inverter 50 includes a DC power source 80, a coupling capacitor 90, and plurality of switching devices $100a_{1-4}$, $100b_{1-4}$, and $100c_{1-4}$. The DC power source 80 is preferably a battery or rectified AC power source, and the capacitor 90 absorbs transients or spikes generated during operation of the switching devices $100a_{1-4}$, $100b_{1-4}$, and $100c_{1-4}$. Although the switching devices $100a_{1-4}$, $100b_{1-4}$, and $100c_{1-4}$ are depicted in FIG. 3 as insulated gate bipolar transistors (IGBETs), it is contemplated that the switching devices $100a_{1-4}$, $100b_{1-4}$, and $100c_{1-4}$ can be other suitable switching devices, such as, for example, field-effect transistors (FETs), bipolar junction transistors (BJTs), or the like.

The synchronous motor 60 preferably comprises an A-phase winding, a B-phase winding, and a C-phase winding, although the synchronous motor 60 can comprise any number of phase windings as is known to those skilled in the art. The synchronous motor 60 further has associated therewith a position transducer 70 coupled to the rotor (not shown) of the synchronous motor 60. The position transducer 70, like the position transducer 16 of FIG. 1, detects the angular position $r(\theta)$ of the rotor (not shown) of the synchronous motor 60 with respect to a reference position. This feedback position signal $r(\theta)$ is supplied by the position transducer 70 to the controller 30. While the synchronous motor 60 can be any type of synchronous motor, e.g., a permanent magnet synchronous motor, a reluctance synchronous motor, a field-excited synchronous motor, or the like, the synchronous motor 60 is preferably of the permanent-magnet type. The reason for this is that permanent-magnet synchronous motors generally have relatively accurate position transducers coupled thereto, thereby making permanent-magnet synchronous motors especially suited for the purposes of the invention. To the contrary, other types of synchronous motors generally have either very low accuracy position transducers, e.g., reluctance synchronous motors, or no position transducers at all, e.g., field-excited synchronous motors, coupled thereto and are, therefore, not as well suited for the purposes of the invention.

Operation of the synchronous motor circuit 20 of FIG. 3 will now be described.

Assuming the excitation and reluctance components of the torque-angle profile of the motor 60 are known, operation of the synchronous motor circuit 20 generally begins with the issuance of a-torque command by an operator to the controller 30. For the purposes of this invention, the torque command represents a desired output torque of the synchronous motor 60 and is generally represented by an output torque $T_s$.

Upon receipt of the torque command and the position feedback signal $r(\theta)$, the controller establishes reference currents $i_{aREF}$, $i_{bREF}$, and $i_{cREF}$ for the A-phase winding, B-phase winding, and C-phase winding, respectively, of the motor 60. Preferably, the controller 30 establishes the reference currents $i_{aREF}$, $i_{bREF}$, and $i_{cREF}$ from the excitation component and reluctance component of the torque-angle profile of the motor 60 in the manner described above.

The controller 14 supplies the reference currents $i_{aREF}$, $i_{bREF}$, and $i_{cREF}$ to the current regulator 40 where they are compared with feedback currents $i_{aFB}$, $i_{bFB}$, and $i_{cFB}$, respectively. As illustrated in FIG. 3, the feedback currents $i_{aFB}$, $i_{cFB}$, and $i_{cFB}$ are detected at the outputs of the switching devices $100a_{1-4}$, $100b_{1-4}$, and $100c_{1-4}$, respectively, of the inverter 50 by current sensors (not shown), such as, for example, Hall sensors, sensing transformers, current sensing transistors, or the like.

Upon comparing the reference currents $i_{aREF}$, $i_{bREF}$, and $i_{cREF}$ with the feedback currents $i_{aFB}$, $i_{bFB}$, and $i_{cFB}$, respectively, the current regulator 40 generates switching signals in the form of pulses for turning the switching devices $100a_{1-4}$, $100b_{1-4}$, and $100c_{1-4}$ of the inverter 50 on and off. Preferably, the current regulator generates these switching signals in such a manner that the feedback currents $i_{aFB}$, $i_{bFB}$, and $i_{cFB}$ track the reference currents $i_{aREF}$, $i_{bREF}$, and $i_{cREF}$, respectively. To accomplish this tracking, the current regulator 40 can perform any number of known tracking or pulse-width modulation switching techniques including the "Bang-Bang" control method and the "Pulse-Width Modulation" control method, both of which are well-known in the art. Thus, the current regulator 40 can comprise, for example, the comparator circuit illustrated in FIG. 4.

In the circuit of FIG. 4, the comparator 110a compares the reference current $i_{aREF}$ with the feedback current $i_{aFB}$ to generate a switching signal $SW_a$. The switching signal $SW_a$ is applied to the switching devices $100a_1$ and $100a_3$. The switching signal $SW_a$ is also inverted by an inverter 120a and thereafter applied to the switching devices $100a_2$ and $100a_4$. When the reference current $i_{aREF}$ is less than the feedback current $i_{aFB}$, the switching signal $SW_a$ operates to turn the switching devices $100a_1$ and $100a_3$ on and to turn the switching devices $100a_2$ and $100a_4$ off. Similarly, when the reference current $i_{aREF}$ is greater than the feedback current $i_{aFB}$, the switching signal $SW_a$ operates to turn the switching devices $100a_1$ and $100a_3$ off and to turn the switching devices $100a_2$ and $100a_4$ on.

Like the comparator 110a, the comparator 110b compares the reference current $i_{bREF}$ with the feedback current $i_{bFB}$ to generate a switching signal $SW_b$. The switching signal $SW_b$ is applied to the switching devices $100b_1$ and $1004b_3$. Similarly, the comparator 110c compares the reference current $i_{cREF}$ with the feedback current $i_{cFB}$ to generate a switching signal $SW_c$ which is applied to the switching devices $100c_1$ and $100c_3$. The switching signals $SW_b$ and $SW_c$ are also inverted by inverters 120b and 120c, respectively, and thereafter applied to the switching devices $100b_2$ and $100b_4$ and to the switching devices $100c_2$ and $100c_4$, respectively.

When the reference current $i_{bREF}$ is less than the feedback current $i_{bFB}$, the switching signal $SW_b$ operates to turn the switching devices $100b_1$ and $100b_3$ on and to turn the switching devices $100b_2$ and $100b_4$ off. And when the reference current $i_{bREF}$ is greater than the feedback current $i_{bFB}$, the switching signal $SW_b$ operates to turn the switching devices $100b_1$ and $100b_3$ off and to turn the switching devices $100b_2$ and $100b_4$ on. Similarly, when the reference current $i_{cREF}$ is less than the feedback current $i_{cFB}$, the switching signal $SW_c$ operates to turn the switching devices $100c_1$ and $100c_3$ on and to turn the switching devices $100c_2$ and $100c_4$ off. And when the reference current $i_{cREF}$ is greater than the feedback current $i_{cFB}$, the switching signal $SW_c$ operates to turn the switching devices $100c_1$ and $100c_3$ off and to turn the switching devices $100c_2$ and $100c_4$ on.

In this manner, the current regulator 40 controls the inverter 50 such that the feedback currents $i_{aFB}$, $i_{bFB}$, and $i_{cFB}$ track the reference currents $i_{aREF}$, $i_{bREF}$, and $i_{cREF}$. Thus, the phase windings of the synchronous motor 60 are energized by the inverter 50 in a sequence such that the motor 60 produces an output torque in accordance with the torque command.

Figure 5:
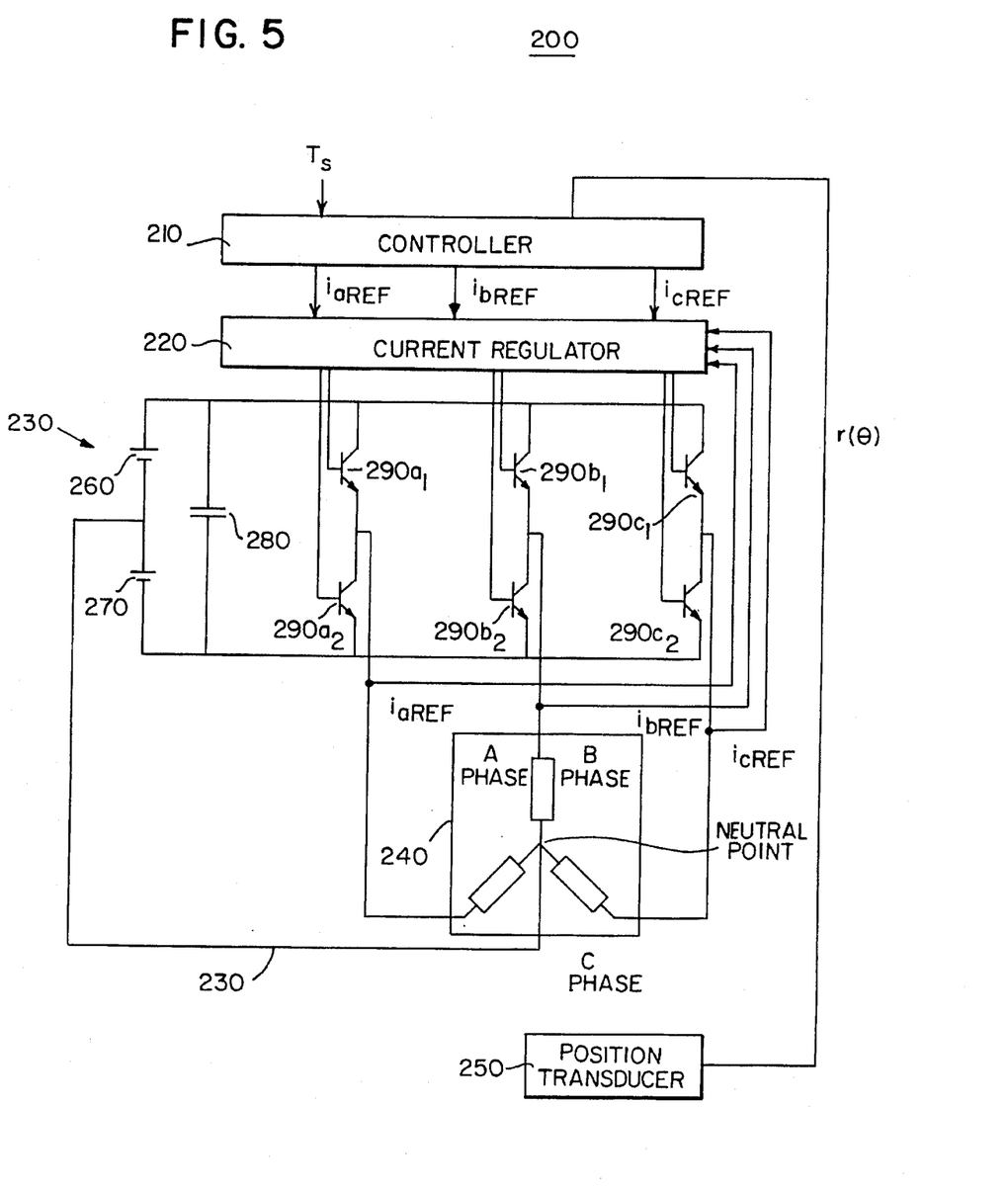
FIG. 5 is a circuit diagram of a second motor circuit in accordance with the teachings of the present invention.

FIG. 5 illustrates a synchronous motor circuit 200 as an alternative to that illustrated in FIG. 3. As shown in FIG. 5, the synchronous motor circuit 200 comprises a controller 210, a current regulator 220, an inverter 230, a synchronous motor 240, and a position transducer 250. Preferably, the controller 210 is the same as the controller 30 of FIG. 3, and the regulator 220 preferably includes a comparator circuit such as that shown in FIG. 6. Alternatively, the current regulator 220 can be implemented in software stored in an executed by the controller 210 or other processor (not shown).

The inverter 230 includes two DC power sources 260 and 270, a coupling capacitor 280, and a plurality of switching devices $290a_{1-2}$, $290b_{1-2}$, and $290c_{1-2}$. The DC power sources 260 and 270 are preferably batteries or rectified AC power sources, and the capacitor 280 absorbs transients or spikes generated during operation of the switching devices $290a_{1-2}$, $290b_{1-2}$, and $290c_{1-2}$. Although the switching devices $290a_{1-2}$, $290b_{1-2}$, and $290c_{1-2}$ are depicted in FIG. 5 as insulated gate bipolar transistors (IGBETs), it is contemplated that the switching devices $290a_{1-2}$, $290b_{1-2}$, and $290c_{1-2}$ can be other suitable switching devices, such as, for example, field-effect transistors (FETs), bipolar junction transistors (BJTs), or the like.

The synchronous motor 240 preferably comprises an A-phase winding, a B-phase winding, and a C-phase winding, although the synchronous motor 240 can comprise any number of phase windings as is known to those skilled in the art. The synchronous motor 240 further has associated therewith a position transducer 250 coupled to the rotor (not shown) of the synchronous motor 240 for detecting the angular position $r(\theta)$ of the rotor (not shown) with respect to a reference position. The feedback position signal $r(\theta)$ is supplied by the position transducer 250 to the controller 210. While the synchronous motor 240 can be any type of synchronous motor, the synchronous motor 240 is preferably of the permanent-magnet type. Again, the reason for this preference is that permanent-magnet synchronous motors generally have relatively accurate position transducers coupled thereto making them especially suited for the purposes of the invention.

Operation of the synchronous motor circuit 200 of FIG. 5 will now be described.

Assuming the excitation and reluctance components of the torque-angle profile of the motor 240 are known, operation of the synchronous motor circuit 200 generally begins with the issuance of a torque command by an operator to the controller 210. Again, the torque command represents a desired output torque of the synchronous motor 240 and is generally represented by an output torque $T_s$.

Upon receipt of the torque command $T_s$ and the position feedback signal $r(\theta)$, the controller 210 establishes reference currents $i_{aREF}$, $i_{bREF}$, and $i_{cREF}$ for the A-phase winding, B-phase winding, and C-phase winding, respectively, of the motor 240. Preferably, the controller 210 establishes the reference currents $i_{aREF}$, $i_{bREF}$, and $i_{cREF}$ from the excitation component and reluctance component of the torque-angle profile of the motor 240 in the manner described above.

Figure 6:
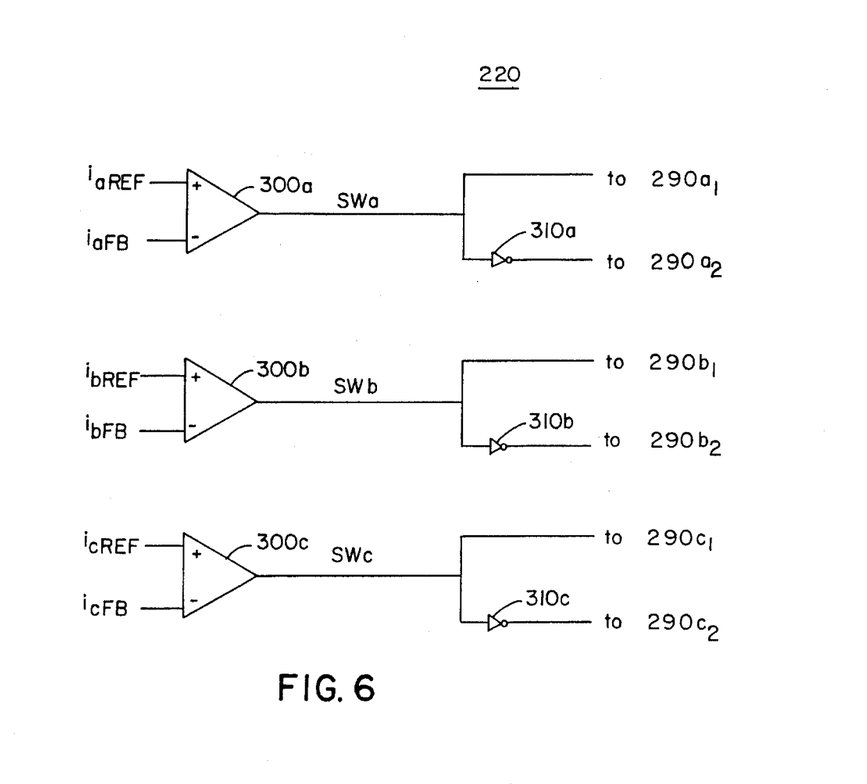
FIG. 6 is a circuit diagram of the current regulator of the motor circuit of FIG. 5.

The controller 210 supplies the reference currents $i_{aREF}$, $i_{bREF}$, and $i_{cREF}$ to the current regulator 220 where they are compared with feedback currents $i_{aFB}$, $i_{bFB}$, and $i_{cFB}$, respectively. As illustrated in FIG. 6, the feedback currents $i_{aFB}$, $i_{bFB}$, and $i_{cFB}$ are detected at the outputs of the switching devices $290a_{1-2}$, $290b_{1-2}$, and $290c_{1-2}$, respectively, of the inverter 230 by current sensors (not shown), such as, for example, Hall sensors, sensing transformers, current sensing transistors, or the like.

Upon comparing the reference currents $i_{aREF}$, $i_{bREF}$, and $i_{cREF}$ with the feedback currents $i_{aFB}$, $i_{bFB}$, and $i_{cFB}$, respectively, the current regulator 220 generates switching signals in the form of pulses for turning the switching devices $290a_{1-2}$, $290b_{1-2}$, and $290c_{1-2}$ of the inverter 230 on and off. Preferably, the current regulator 220 generates these switching signals in such a manner that the feedback currents $i_{aFB}$, $i_{bFB}$, and $i_{cFB}$ track the reference currents $i_{aREF}$, $i_{bREF}$, and $i_{cREF}$, respectively. To accomplish this tracking, the current regulator 220 can perform any number of known tracking or pulse-width modulation switching techniques including the "Bang-Bang" control method and the "Pulse-Width Modulation" control method, both of which are well-known in the art. Thus, the current regulator 220 can comprise, for example, the comparator circuit illustrated in FIG. 6.

In the circuit of FIG. 6, the comparator 300a compares the reference current $i_{aREF}$ with the feedback current $i_{aFB}$ to generate a switching signal $SW_a$. The switching signal $SW_a$ is applied to the switching device $290a_1$. The switching signal $SW_a$ is also inverted by an inverter 310a and thereafter applied to the switching device $290a_2$. When the reference current $i_{aREF}$ is less than the feedback current $i_{aFB}$, the switching signal $SW_a$ operates to turn the switching device $290a_1$ on and to turn the switching device $290a_2$ off. Similarly, when the reference current $i_{aREF}$ is greater than the feedback current $i_{aFB}$, the switching signal $SW_a$ operates to turn the switching device $290a_1$ off and to turn the switching devices $290a_2$ on.

Like the comparator 300a, the comparator 300b compares the reference current $i_{bREF}$ with the feedback current $i_{bFB}$ to generate a switching signal $SW_b$. The switching signal $SW_b$ is applied to the switching device $290b_1$. Similarly, the comparator 300c compares the reference current $i_{cREF}$ with the feedback current $i_{cFB}$ to generate a switching signal $SW_c$ which is applied to the switching device $290c_1$. The switching signals $SW_b$ and $SW_c$ are also inverted by inverters 310b and 310c, respectively, and thereafter applied to the switching devices $290b_2$ and $290c_2$, respectively.

When the reference current $i_{bREF}$ is less than the feedback current $i_{bFB}$, the switching signal $SW_b$ operates to turn the switching device $290b_1$ on and to turn the switching device $290b_2$ off. And when the reference current $i_{bREF}$ is greater than the feedback current $i_{bFB}$, the switching signal $SW_b$ operates to turn the switching device $290b_1$ off and to turn the switching device $290b_2$ on. Similarly, when the reference current $i_{cREF}$ is less than the feedback current $i_{cFB}$, the switching signal $SW_c$ operates to turn the switching device $290c_1$ on and to turn the switching device $290c_2$ off. And when the reference current $i_{cREF}$ is greater than the feedback current $i_{cFB}$, the switching signal $SW_c$ operates to turn the switching device $290c_1$ off and to turn the switching device $290c_2$ on.

In this manner, the current regulator 220 controls the inverter 230 such that the feedback currents $i_{aFB}$, $i_{bFB}$, and $i_{cFB}$ track the reference currents $i_{aREF}$, $i_{bREF}$, and $i_{cREF}$. Thus, the phase windings of the synchronous motor 240 are energized by the inverter 230 in a sequence such that the motor 240 produces an output torque in accordance with the torque command.

It should be appreciated that the motor circuit 200 of FIG. 5 differs from the motor circuit 20 of FIG. 3 in, among other things, the handling of nonzero return currents. In particular, each phase winding of the synchronous motor 60 of FIG. 3 has an independent current path for returning to ground nonzero return neutral currents which result from triplen harmonics in the reference currents $i_{aREF}$, $i_{bREF}$, and $i_{cREF}$. The synchronous motor 240 Of FIG. 200, on the other hand, has but a single nonzero return neutral current path 320. Thus, the motor circuit 200 of FIG. 5 has a simpler structure than the motor circuit 20 of FIG. 3. It should also be appreciated that both the motor circuit 20 of FIG. 3 and the motor circuit 200 of FIG. 5 are preferred over conventional star or delta type inverters because nonzero return neutral currents generally cannot flow freely through those types of conventional inverters.

It will be apparent to those skilled in the art that various modifications and variations can be made in the present invention without departing from the spirit or scope of the invention. Thus, it is intended that the present invention cover the modifications and variations of the invention provided they come within the scope of the appended claims and their equivalents.

What is claimed is:

1. A method of establishing a reference current for use in operating a synchronous motor, comprising the steps of:
   (a) obtaining a torque-angle profile of the motor;
   (b) obtaining an excitation component and a reluctance component of the torque-angle profile;
   (c) establishing a phase current from the excitation component and the reluctance component of the torque-angle profile;
   (d) establishing a delay angle of the phase current;
   (e) establishing a reference torque from the delay angle, the phase current, and the excitation component and reluctance component of the torque-angle profile; and
   (f) establishing a reference current from the reference torque.

2. The method of claim 1, wherein the excitation component and the reluctance component of the torque-angle profile are obtained using spectral analysis.

3. The method of claim 2, wherein the spectral analysis includes Fourier analysis.

4. A method of operating a synchronous motor in accordance with a torque command and an excitation component and reluctance component of a torque-angle profile of the motor, comprising the steps of:
   (a) establishing a phase current from the excitation component and the reluctance component of the torque-angle profile;
   (b) establishing a delay angle of the phase current;
   (c) establishing a reference torque from the delay angle, the phase current, and the excitation component and reluctance component of the torque-angle profile;
   (d) establishing the reference current from the reference torque;
   (e) comparing the reference current with a feedback current to generate a switching signal;
   (f) generating a drive current in accordance with the switching signal; and
   (g) supplying the motor with the drive current.

5. Apparatus for establishing a reference current for use in operating a synchronous motor, comprising:
   (a) means for obtaining a torque-angle profile of the motor;
   (b) means for obtaining a reluctance component of the torque-angle profile;
   (c) means for establishing a phase current from the excitation component and the reluctance component of the torque-angle profile;
   (d) means for establishing a delay angle of the phase current;
   (e) means for establishing a reference torque from the delay angle, the phase current, and the excitation component and reluctance component of the torque-angle profile; and
   (f) means for establishing a reference current from the reference torque.

6. Apparatus for operating a synchronous motor in accordance with a torque command and an excitation component and reluctance component of a torque-angle profile of the motor, comprising:

(a) a controller for establishing a reference current from the torque command and the excitation component and reluctance component of the torque-angle profile, said controller including:
  (1) means for establishing a phase current from the excitation component and the reluctance component of the torque-angle profile;
  (2) means for establishing a delay angle of the phase current;
  (3) means for establishing a reference torque from the delay angle, the phase current, and the excitation component and reluctance component of the torque-angle profile; and
  (4) means for establishing the reference current from the reference torque;
(b) a current regulator for comparing the reference current with a feedback current to generate a switching signal; and
(c) an inverter for generating a drive current in accordance with the switching signal and for supplying the motor with the drive current.

7. The apparatus of claim 6, wherein the inverter includes a plurality of switching devices and a nonzero return neutral current path to the synchronous motor.

* * * * *